United States Patent
Bichkar et al.

(10) Patent No.: US 12,024,158 B2
(45) Date of Patent: Jul. 2, 2024

(54) SYSTEM AND METHOD FOR STROKING A DRIVELINE DISCONNECT CLUTCH

(71) Applicant: Ford Global Technologies, LLC, Dearborn, MI (US)

(72) Inventors: Akshay Bichkar, Ann Arbor, MI (US); Corey James Blue, Belleville, MI (US); Jason Meyer, Canton, MI (US); Bradley Dean Riedle, Northville, MI (US); Timothy Baxendale, Portales, NM (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 17/938,820

(22) Filed: Oct. 7, 2022

(65) Prior Publication Data

US 2024/0116491 A1    Apr. 11, 2024

(51) Int. Cl.
*B60W 20/40*        (2016.01)
*B60K 6/387*        (2007.10)
(Continued)

(52) U.S. Cl.
CPC ............ *B60W 20/40* (2013.01); *B60K 6/387* (2013.01); *B60W 10/02* (2013.01); *B60W 10/06* (2013.01); *B60W 10/08* (2013.01); *F16D 48/06* (2013.01); *B60W 2520/10* (2013.01); *B60W 2710/021* (2013.01); *B60W 2710/025* (2013.01); *B60W 2710/06* (2013.01); *B60W 2710/08* (2013.01); *B60Y 2200/92* (2013.01); *F16D 2500/3024* (2013.01); *F16D 2500/3026* (2013.01);
(Continued)

(58) Field of Classification Search
CPC ...... B60W 20/40; B60W 10/02; B60W 10/06; B60W 10/08; B60W 2520/10; B60W 2710/021; B60W 2710/06; B60W 2710/08; B60W 2710/02–024; B60W 2520/04; B60W 2520/105; B60W 2520/28; B60W 2510/0638–0647; B60W 2510/081; B60W 2510/0652; B60W 2510/082; F16D 48/06; F16D 2500/70402–70424; F16D 2500/3108–3115; F16D 2500/3067; F16D 2500/3068; B60Y 2200/92
See application file for complete search history.

(56) References Cited

U.S. PATENT DOCUMENTS 8,538,643 B1    9/2013  Wang et al.
9,108,613 B2    8/2015  Gibson et al.
(Continued)

OTHER PUBLICATIONS

Bichkar, A et al., "Dynamic Adaption Methods and System for a Driveline Disconnect Clutch," U.S. Appl. No. 17/643,715, filed Dec. 10, 2021, 40 pages.
(Continued)

*Primary Examiner* — Richard W Ridley
*Assistant Examiner* — Aimee Tran Nguyen
(74) *Attorney, Agent, or Firm* — David Kelley; McCoy Russell LLP

(57) ABSTRACT

Systems and methods for operating a driveline disconnect clutch of a hybrid vehicle are presented. In one example, a driveline disconnect clutch is positioned according to whether or not there may be slip across the driveline disconnect clutch. In one example, slip may be inferred from vehicle speed and a torque converter impeller speed.

12 Claims, 4 Drawing Sheets

(51) Int. Cl.
    *B60W 10/02*     (2006.01)
    *B60W 10/06*     (2006.01)
    *B60W 10/08*     (2006.01)
    *F16D 48/06*     (2006.01)

(52) U.S. Cl.
    CPC .............. *F16D 2500/30406* (2013.01); *F16D 2500/3108* (2013.01)

(56) References Cited

U.S. PATENT DOCUMENTS

| | | |
|---|---|---|
| 9,278,685 B2 | 3/2016 | Gibson et al. |
| 9,296,380 B2 | 3/2016 | Ortmann et al. |
| 9,545,908 B2 | 1/2017 | Doering et al. |
| 9,566,977 B2 | 2/2017 | Gibson et al. |
| 10,065,626 B2 | 9/2018 | Wang et al. |
| 10,597,022 B2 | 3/2020 | Wang et al. |
| 11,247,663 B2 | 2/2022 | Yamazaki et al. |
| 2014/0278018 A1* | 9/2014 | Gibson ............... B60W 10/026 701/112 |
| 2015/0046049 A1* | 2/2015 | Shelton ........... B60W 30/18027 477/77 |
| 2015/0266462 A1 | 9/2015 | Johri et al. |
| 2015/0360683 A1 | 12/2015 | Gibson et al. |
| 2016/0001771 A1* | 1/2016 | Nakanishi ............. B60W 10/06 180/65.265 |
| 2019/0241175 A1 | 8/2019 | Ford et al. |
| 2021/0245751 A1 | 8/2021 | Syed et al. |
| 2022/0009473 A1 | 1/2022 | Zhao et al. |
| 2022/0063593 A1* | 3/2022 | Fukuda .................... B60K 6/48 |

OTHER PUBLICATIONS

Bichkar, A et al., "System and Method for Adjusting Driveline Disconnect Clutch Boost Pressure," U.S. Appl. No. 17/822,289, filed Aug. 25, 2022, 33 pages.

Bichkar, A et al., "System and Method for Learning Driveline Disconnect Clutch Liftoff," U.S. Appl. No. 17/823,812, filed Aug. 31, 2022, 37 pages.

* cited by examiner

SYSTEM AND METHOD FOR STROKING A DRIVELINE DISCONNECT CLUTCH

TECHNICAL FIELD

The present description relates to methods and a system for operating a driveline disconnect clutch of a hybrid vehicle.

BACKGROUND AND SUMMARY

A driveline disconnect clutch may selectively couple an engine to a vehicle driveline. The driveline disconnect clutch may be fully opened or fully closed. Additionally, the driveline disconnect clutch may be partially closed where the capacity of the driveline disconnect to transfer torque is zero or where the driveline disconnect clutch torque capacity is between zero and the torque capacity of the fully closed driveline disconnect clutch. The driveline disconnect clutch may be held at a stroked position (e.g., where driveline disconnect clutch plates begin to touch and where driveline disconnect clutch torque capacity is substantially zero) to reduce the amount of time it takes to close the driveline disconnect clutch. However, operating the driveline disconnect clutch at the stroke position can increase fuel consumption and reduce driveline disconnect clutch durability. Conversely, if the driveline disconnect clutch is held at a position before the stroked position (e.g., a more open position), engine starting may be delayed and clutch response may be inconsistent.

The inventors herein have recognized the above-mentioned issue and have developed a method for operating a vehicle, comprising: via one or more controllers, adjusting a driveline disconnect clutch to a stroked position in response to vehicle speed being less than a first threshold, torque converter impeller speed being less than a second threshold, and a derivative of torque converter impeller speed being less than a third threshold.

By adjusting a driveline disconnect clutch to a stroked position in response to vehicle speed being less than a first threshold, torque converter impeller speed being less than a second threshold, and a derivative of torque converter impeller speed being less than a third threshold, it may be possible to provide improved torque converter response while reducing energy consumption and driveline disconnect clutch wear. In particular, the driveline disconnect clutch may be moved closer to a position where the driveline disconnect clutch is engaged during conditions where slip across the driveline disconnect clutch is expected to be low. This may allow the driveline disconnect clutch to close sooner and operate in a more repeatable way. On the other hand, when driveline disconnect clutch speed is expected to be larger, the driveline disconnect clutch may be held at a more open position to reduce energy consumption and driveline disconnect clutch wear.

The present description may provide several advantages. In particular, the approach may improve a response of a driveline disconnect clutch. Further, the approach may reduce energy consumption when the driveline disconnect clutch is held in an open position. Additionally, the approach may reduce the possibility of driveline torque disturbances.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
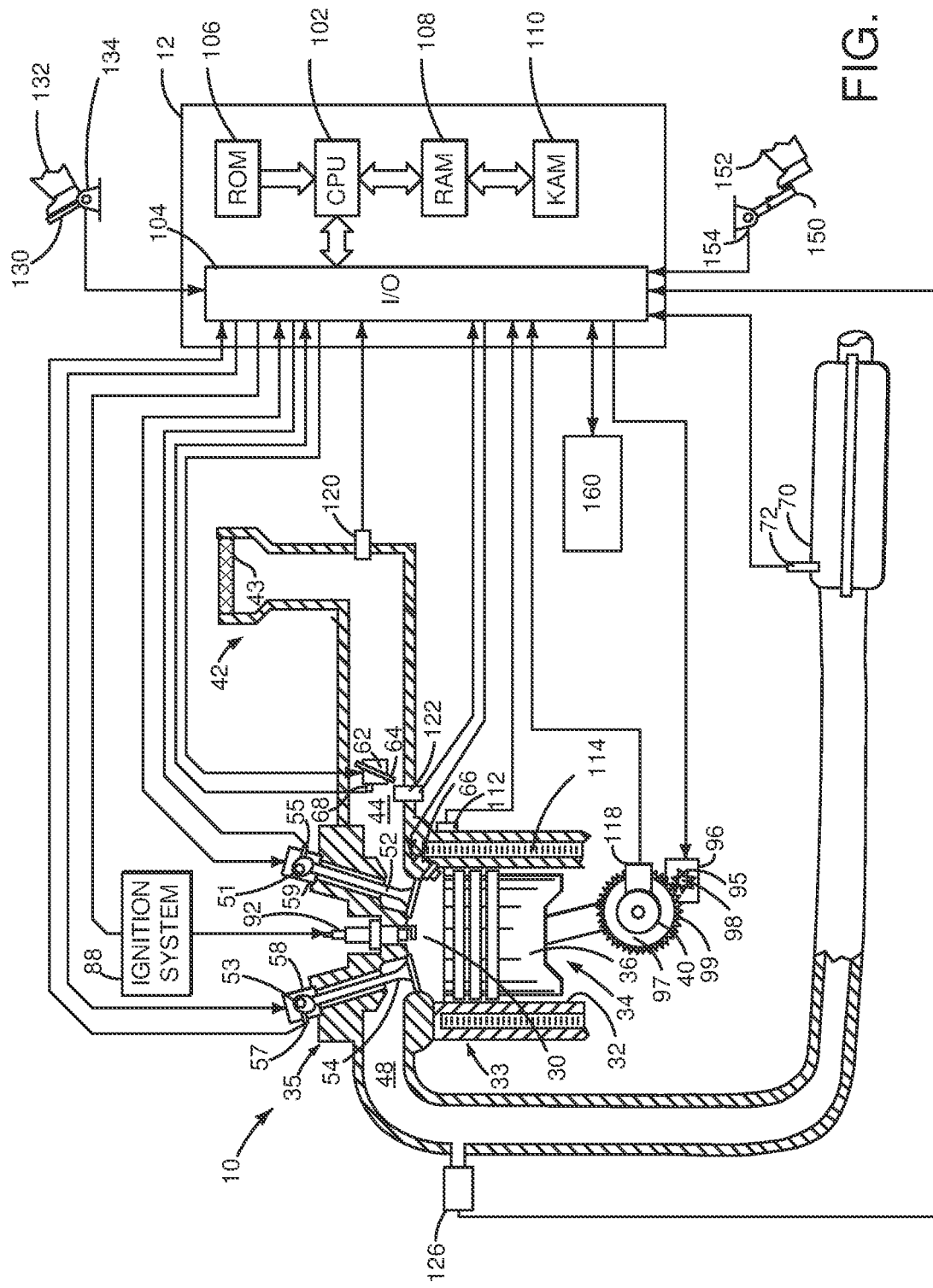
FIG. 1 is a schematic diagram of an engine.
Figure 2:
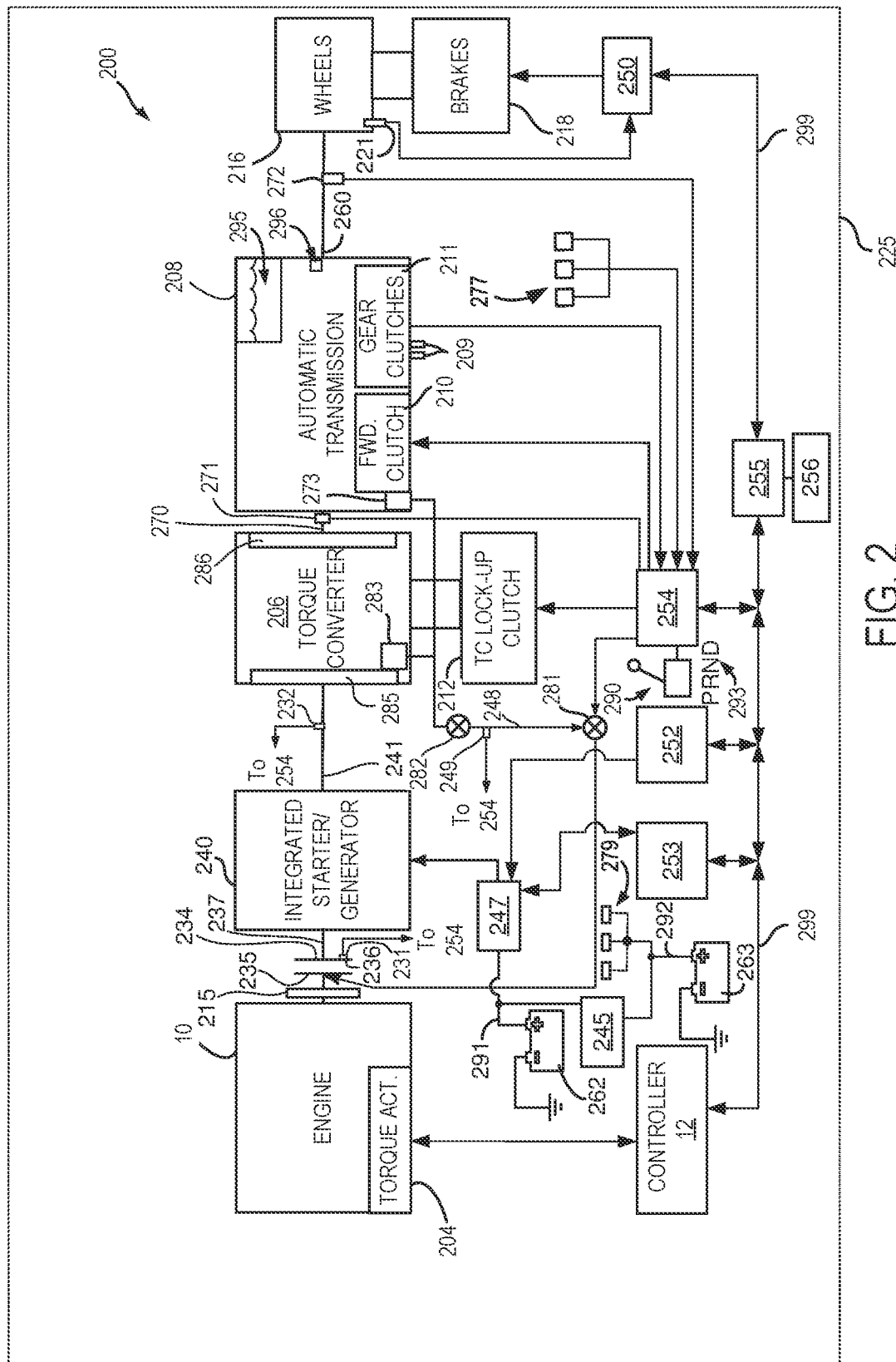
FIG. 2 is a schematic diagram of a hybrid vehicle driveline including the engine of FIG. 1.
Figure 3:
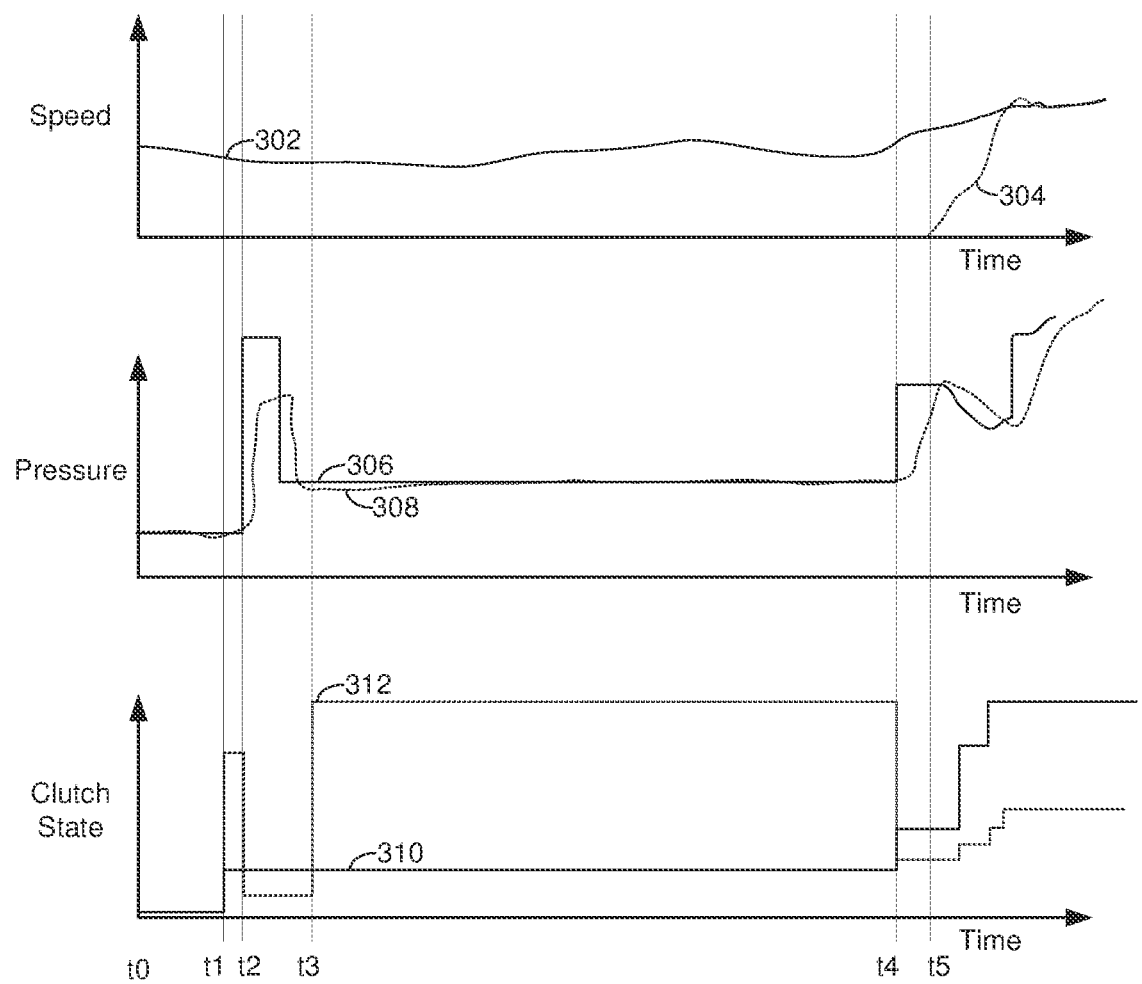
FIG. 3 shows a plot of signals of interest when controlling a position of a driveline disconnect clutch.

The present description is related to improving operation of a driveline disconnect clutch of a hybrid vehicle. In particular, a pressure within a driveline disconnect clutch and/or a position of the driveline disconnect clutch may be adjusted to reduce driveline disconnect clutch related losses and to improve a response time of the driveline disconnect clutch. During conditions when driveline disconnect clutch slip (e.g., a difference in speed between a rotational speed of an input side of the driveline disconnect clutch and a rotational speed of an output side of the driveline disconnect clutch) may be greater than a threshold amount of slip, a driveline disconnect clutch may be de-stroked from a stroke position. During conditions when driveline disconnect clutch slip may be less than the threshold amount of slip, the driveline disconnect clutch may be positioned at a stroke position to reduce driveline disconnect clutch response time. The driveline disconnect clutch may be coupled to an engine of the type that is shown in FIG. 1. The engine may be included in a driveline as shown in FIG. 2. The driveline disconnect clutch may be positioned as shown in the plots of FIG. 3. The driveline disconnect clutch may be operated according to the method of FIG. 4.

Referring to FIG. 1, engine 10 (e.g., an internal combustion engine), comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Flywheel starter 96 (e.g., low voltage (operated with less than 30 volts) electric machine) includes pinion shaft 98 and pinion gear 95. Pinion shaft 98 may selectively advance pinion gear 95 to engage ring gear 99. Flywheel starter 96 may be directly mounted to the front of the engine or the rear of the engine. In some examples, flywheel starter 96 may selectively supply torque to crankshaft 40 via a belt or chain. In one example, flywheel starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Driveline 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, driveline 200 may be powered by engine 10 and electric machine 240. In other examples, engine 10 may be omitted. Engine 10 may be started with an engine starting system shown in FIG. 1 or via electric machine 240 also known as an integrated starter/generator (ISG). Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between electric machine 240 and electric energy storage device 262.

An engine output power may be transmitted to an input or first side of driveline disconnect clutch 235 through dual mass flywheel 215. A speed of the input side of the driveline disconnect clutch may be determined via engine position sensor 118 shown in FIG. 1. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid in line 248 that may be supplied to driveline disconnect clutch pressure control valve 281. A position of valve 281 may be modulated to control a pressure of fluid that is supplied to driveline disconnect clutch 235. The output or second side 234 of driveline disconnect clutch 236 is shown mechanically coupled to electric machine input shaft 237. A speed of the output side of the driveline disconnect clutch may be determined via position sensor 232.

Electric machine 240 may be operated to provide power to driveline 200 or to convert powertrain power into electrical energy to be stored in electric energy storage device 262 in a regeneration mode. Electric machine 240 is in electrical communication with electric energy storage device 262. Electric machine 240 has a higher output power capacity than flywheel starter 96 shown in FIG. 1. Further, electric machine 240 directly drives driveline 200 or is directly driven by driveline 200. There are no belts, gears, or chains to couple electric machine 240 to driveline 200. Rather, electric machine 240 rotates at the same rate as driveline 200. Electric energy storage device 262 (e.g., high voltage battery or power source, which may be referred to as a traction battery) may be a battery, capacitor, or inductor. The downstream side of electric machine 240 is mechanically coupled to the torque converter impeller 285 of torque converter 206 via shaft 241. The upstream side of the electric machine 240 is mechanically coupled to the driveline disconnect clutch 236. Electric machine 240 may provide a positive power or a negative power to driveline 200 via operating as a motor or generator as instructed by electric machine controller 252.

Torque converter 206 includes a torque converter turbine 286 to output power to input shaft 270. Input shaft 270 mechanically couples torque converter 206 to automatic transmission 208. Torque converter 206 also includes a torque converter lock-up clutch 212 (TCC). Power is directly transferred from torque converter impeller 285 to torque converter turbine 286 when the torque converter lock-up clutch is locked. The torque converter lock-up clutch is electrically operated by controller 254. Alternatively, the torque converter lock-up clutch may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes transmission fluid 295 to operate driveline disconnect clutch 236, forward clutch 210, and gear clutches 211. Pump 283 is driven via torque converter impeller 285, which rotates at a same speed as electric machine 240. In some examples, an electric transmission fluid pump 273 may also be provided to pressurize transmission fluid 295. The transmission fluid may be applied as a coolant to cool the electric machine 240 and apply/release driveline disconnect clutch 236. Line 248 (e.g., a conduit) may receive transmission fluid 295 from electric transmission fluid pump 273 and/or pump 283. Pressure in line 248 (e.g., line pressure) may be sensed via pressure sensor 249 and pressure in driveline disconnect clutch 236 may be sensed via pressure sensor 231.

Automatic transmission 208 includes gear clutches 211 (e.g., gears 1-10) and forward clutch 210 that may be actuated via transmission fluid 295. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Parking pawl 296 may be engaged to prevent motion of output shaft 260 when automatic transmission 208 is in park. Transmission controller 254 selectively activates or engages torque converter lock-up clutch 212, gear clutches 211, and forward clutch 210. Transmission controller also selectively deactivates or disengages torque converter lock-up clutch 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via brake controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the electric machine. Vehicle system controller 255 requests the engine power from controller 12 and the electric machine power from electric machine controller 252. If the electric machine power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and torque converter lock-up clutch lockup schedules that may be based on input shaft power and vehicle speed. In some conditions when it may be desired to charge electric energy storage device 262, a charging power (e.g., a negative electric machine power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the electric machine 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and electric machine 240 may supply a negative power to transmission input shaft 270, but negative power provided by electric machine 240 and engine 10 may be limited by transmission controller 254 which outputs a transmission input shaft negative power limit (e.g., not to be exceeded threshold value). Further, negative power of electric machine 240 may be limited (e.g., constrained to less than a threshold negative threshold power) based on operating conditions of electric energy storage device 262, by vehicle system controller 255, or electric machine controller 252. Any portion of desired negative wheel power that may not be provided by electric machine 240 because of transmission or electric machine limits may be allocated to engine 10 and/or friction brakes 218 so that the desired wheel power is provided by a combination of negative power (e.g., power absorbed) via friction brakes 218, engine 10, and electric machine 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from rotor and/or armature windings of electric machine as is known in the art.

Transmission controller 254 receives transmission input shaft position via position sensor 271 and speed of electric machine 240 via position sensor 232. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, electric machine temperature sensors, gear selector position sensors, and an ambient temperature sensor. Transmission controller 254 may also receive requested gear input from gear selector 290 (e.g., a human/machine interface device). Gear selector 290 may include positions for gears 1-N (where N is an upper gear number), D (drive), R (reverse), and P (park) as indicated at 293.

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative electric machine power does not cause the wheel power limit to be exceeded. For example, if brake controller 250 issues a negative wheel power limit of 50 N-m, electric machine power is adjusted to provide less than 50 N-m (e.g., 49 N-m) of negative power at the wheels, including accounting for transmission gearing.

Thus, the system of FIGS. 1 and 2 provides for a driveline system, comprising: an internal combustion engine; an integrated starter/generator; a driveline disconnect clutch positioned in a driveline between the internal combustion engine and the integrated starter/generator; and a controller including executable instructions stored in non-transitory memory that cause the controller to adjust a position of the driveline disconnect clutch when the driveline disconnect clutch is at least partially open, including adjusting a position of the driveline disconnect clutch to a stroked position when a slip of the driveline disconnect clutch is less than a threshold. In a first example, the driveline system further comprises additional executable instructions that cause the controller to de-stroke the driveline disconnect clutch from the stroked position when the slip of the driveline disconnect clutch is greater than the threshold. In a second example that may include the first example, the driveline system includes where the slip is a speed difference across the driveline disconnect clutch. In a third example that may include one or both of the first and second examples, the driveline system includes where the stroked position is a position torque capacity begins to increase from substantially zero as a pressure supplied to driveline disconnect clutch increases. In a fourth example that may include one or more of the first through third examples, the driveline system further comprises additional executable instructions that cause the controller to increase a closing amount of the driveline disconnect clutch in response to an engine start request. In a fifth example that may include one or more of the first through fourth examples, the driveline system includes where the engine is started via the integrated starter/generator in response to the engine start request. In a sixth example that may include one or more of the first through fifth examples, the driveline system further comprises additional instructions that cause the controller to propel the vehicle via the integrated starter/generator. In a seventh example that may include one or more of the first through sixth examples, the driveline system includes wherein the slip is determined via two position sensors.

Referring now to FIG. 3, plots of a driveline disconnect clutch operating sequence are shown. The sequence that is shown in FIG. 3 may be provided via the system that is shown in FIGS. 1 and 2. The plots shown in FIG. 3 are time aligned.

The first plot from the top of FIG. 3 is a plot of speed versus time. The vertical axis represents speed and speed increases in the direction of the vertical axis arrow. The horizontal axis represents time and time increases from the left side of the plot to the right side of the plot. Solid trace 302 represents a rotational speed of a torque converter impeller. Dashed trace 304 represents engine speed.

The second plot from the top of FIG. 3 is a plot of pressure versus time. The vertical axis represents pressure and pressure increases in the direction of the vertical axis arrow. The horizontal axis represents time and time increases from the left side of the plot to the right side of the plot. Solid trace 306 represents a commanded driveline disconnect clutch pressure. Dotted line 308 represents a measured driveline disconnect clutch pressure.

The third plot from the top of FIG. 3 represents driveline disconnect clutch state versus time. The vertical axis represents driveline disconnect clutch state. The solid line 310 represents the commanded driveline disconnect clutch state. Dashed line 312 represents the achieved driveline disconnect clutch state.

At time t0, the torque converter impeller speed is at a middle level and engine speed is zero (e.g., not rotating). The commanded drive line disconnect clutch pressure and the measured driveline disconnect pressures are low. The commanded driveline disconnect clutch state and the achieved driveline disconnect clutch state are fully open.

At time t1, there is a request to stroke the driveline disconnect clutch (not shown) based on vehicle speed being less than a threshold speed, torque converter impeller speed being less than a threshold speed, and the derivative of torque converter impeller speed being less than a threshold speed. The engine is not rotating and the torque converter impeller speed is low. The commanded driveline disconnect clutch pressure is unchanged and the measured driveline disconnect clutch pressure is unchanged. The commanded driveline disconnect clutch state is commanded to a stroked state. The achieved driveline disconnect clutch state is preparing for boost phase by waiting for adequate line pressure.

At time t2, the request to stroke the driveline disconnect clutch remains asserted (not shown) and the torque converter impeller speed remains low. The engine is not rotating and the commanded driveline disconnect clutch pressure is changed to a boost pressure. The measured driveline disconnect clutch pressure begins to increase shortly after time t2. The commanded driveline disconnect clutch state remains at the stroked state and the achieved driveline disconnect clutch state is boosting phase Between time t2 and time t3, the torque converter impeller speed is reduced a small amount and the engine remains stopped. The commanded driveline disconnect clutch pressure is reduced from a boost pressure to a stroke pressure. The measured driveline disconnect clutch pressure lags the commanded driveline disconnect clutch pressure, but it has a similar shape as the commanded driveline disconnect clutch pressure. The commanded driveline disconnect clutch state remains at the stroked state and the achieved driveline disconnect clutch state reaches stroked phase At time t3, the request to stroke the driveline disconnect clutch remains asserted (not shown) and the torque converter impeller speed remains low. The engine is not rotating and the commanded driveline disconnect clutch pressure remains at a stroke pressure. The measured driveline disconnect clutch pressure is at the stroke pressure and the commanded driveline disconnect clutch state remains at the stroked state. The achieved driveline disconnect clutch state transitions to indicate stroked state.

Between time t3 and time t4, the torque converter impeller rotational speed remains low and engine speed remains zero. The commanded driveline disconnect clutch pressure and the measured driveline disconnect clutch pressure remain at the stroke pressure. The commanded clutch state and achieved clutch state remain stroked.

At time t4, an engine start request is generated (not shown) and the commanded clutch state is switched to engine starting phase. The achieved clutch state changes to engine starting phase. The torque converter impeller speed is gradually increasing and engine speed remains zero. The commanded driveline disconnect clutch pressure is increased and the measured driveline disconnect clutch pressure begins to increase shortly after time t4.

At time t5, the driveline disconnect clutch is closed sufficiently for the integrated starter/generator (not shown) to begin rotating the engine. Alternatively, the engine may be rotated by the flywheel starter 96 (not shown). The engine speed begins to increase and the torque converter impeller speed increases slowly. The commanded driveline disconnect clutch pressure remains elevated and the measured driveline disconnect clutch pressure continues to increase. The commanded clutch state remains in engine starting phase and the achieved clutch state remains in the engine starting phase. Once engine speed comes close to the torque converter impeller speed, commanded clutch state is lock and achieved clutch state transition to locked to indicate that the clutch has fully closed.

In this way, a driveline disconnect clutch may remain in a stroked state so that a driveline disconnect clutch may be engaged quickly to assist engine starting. If conditions change, such as torque converter impeller speed being reduced to zero, the driveline disconnect clutch may be fully opened to reduce energy consumption by the driveline.

Figure 4:
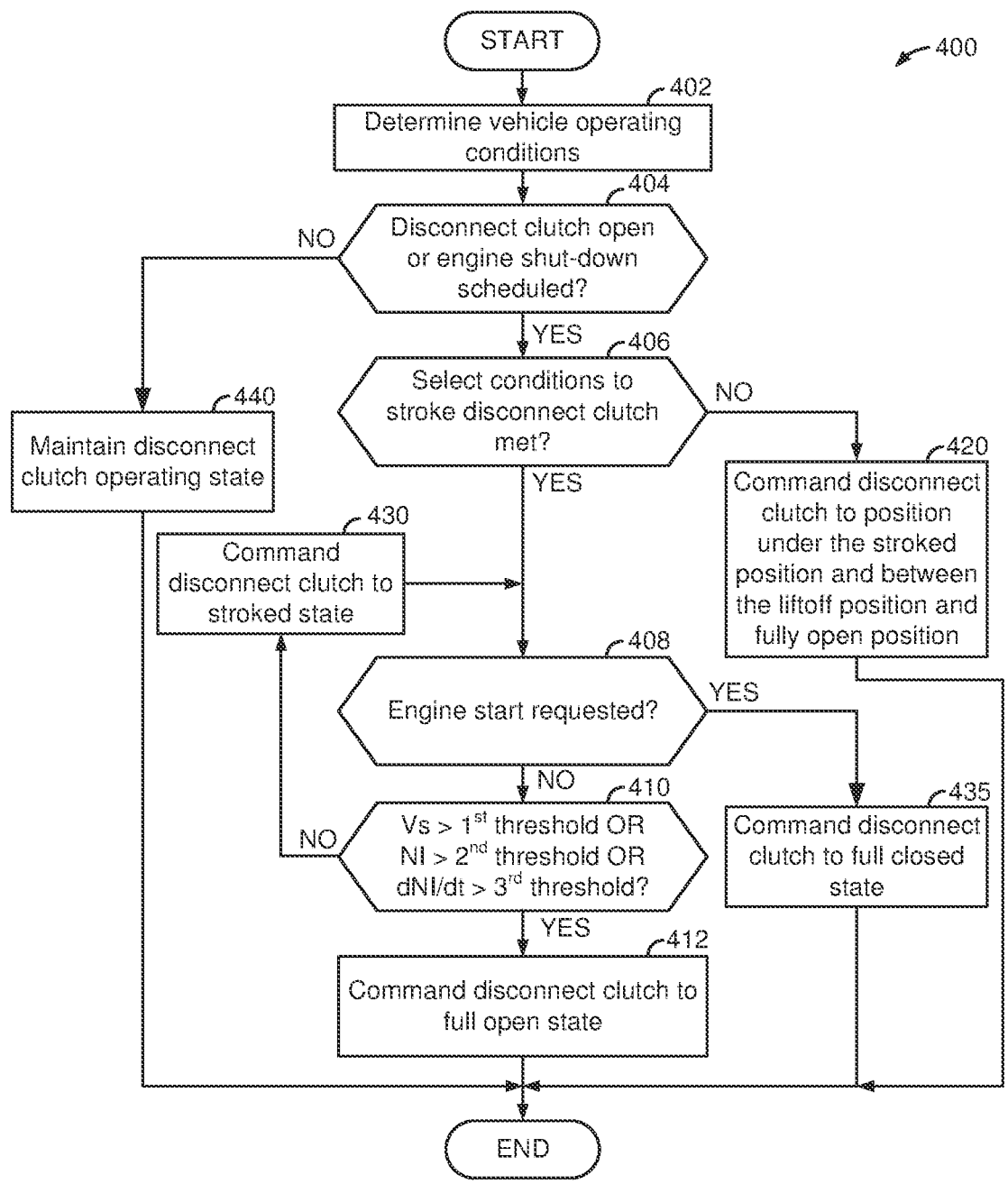
FIG. 4 shows a method for operating a driveline disconnect clutch.

Referring now to FIG. 4, a method for operating a driveline disconnect clutch of a hybrid vehicle is shown. The method of FIG. 4 may be at least partially implemented as executable instructions stored in memory of one or more controllers in the system of FIGS. 1 and 2. Further, the method of FIG. 4 may include actions taken in the physical world by one or more controllers to transform an operating state of the system of FIGS. 1 and 2. Additionally, the method of FIG. 4 may provide the operating sequence shown in FIG. 3 and method 400 may be performed when a vehicle is being propelled via an electric machine.

At 402, method 400 determines vehicle operating conditions. Vehicle operating conditions may include but are not limited to vehicle speed, driver demand torque or power, engine temperature, integrated starter/generator speed and torque, engine speed, transmission line pressure, driveline disconnect clutch pressure, and state of battery charge. Method 400 proceeds to 404.

At 404, method 400 judges whether or not the driveline disconnect clutch is partially open or if there is an engine stop request (e.g., cease combustion within the engine and reduce engine speed to zero). If method 400 judges that the driveline disconnect clutch is partially open or if there is an engine stop request, the answer is yes and method 400 proceeds to 406. Otherwise, the answer is no and method 400 proceeds to 440.

At 440, method 400 maintains the driveline disconnect clutch in its present state (e.g., closed). Method 400 proceeds to exit.

At 406, method 400 judges whether or not select operating conditions are met. In one example, the select operating conditions may include but are not limited to vehicle speed being less than a first threshold speed, torque converter impeller rotational speed being less than a second threshold speed, and a derivative of torque converter impeller speed being less than a third threshold rate of speed. The derivative of torque converter impeller speed may be estimated by the following equation:

$$Timpdelta = \frac{Ti(k) - Ti(k-1)}{t(k) - t(k-1)}$$

where Timpdelta is the torque converter speed derivative, Ti is the torque converter impeller speed, k is the sample number, and t is the time that a sample of torque converter impeller speed was taken. If method 400 judges that the select conditions are met, the answer is yes and method 400 proceeds to 408. Otherwise, the answer is no and method 400 proceeds to 420.

At 420, method 400 adjusts a position of the driveline disconnect clutch to a position that is under the stroked position and between a driveline disconnect clutch liftoff position and the driveline disconnect clutch fully open position. The driveline disconnect clutch liftoff position is a position at which clutch drag (e.g., resistance to motion) begins to increase from a substantially constant value as pressure within the driveline disconnect clutch increases. The driveline disconnect clutch stroked position is a position where the torque capacity of the driveline disconnect clutch begins to increase from a substantially constant value as pressure within the driveline disconnect clutch increases. The liftoff position occurs at a lower driveline disconnect clutch pressure than the driveline disconnect clutch pressure where the stroked position occurs. In one example, method 400 adjusts the driveline disconnect clutch position and pressure (e.g., driveline disconnect clutch pressure drives driveline disconnect clutch position) as a function of torque converter impeller speed and transmission fluid temperature. Method 400 proceeds to exit.

At 408, method 400 judges whether or not an engine start is requested. An engine start request may be generated in response to a low state of battery charge, an increasing driver demand, and/or other vehicle operating conditions. If method 400 judges that an engine start is requested, the answer is yes and method 400 proceeds to 435. Otherwise, the answer is no and method 400 proceeds to 410.

At 435, method 400 increases driveline disconnect clutch pressure to crank the engine and after the engine is running, the driveline disconnect clutch is fully closed. Method 400 proceeds to exit.

At 410, method 400 judges if vehicle speed (Vs) is greater than a first threshold speed, if torque converter impeller speed is greater than a second threshold speed, and if a derivative of torque converter impeller speed is greater than a third threshold. If so, the answer is yes and method 400 proceeds to 412. Otherwise, the answer is no and method 400 proceeds to 430. The conditions mentioned at step 410 may be indicative of conditions where slip across the driveline disconnect clutch is expected to be less than a threshold amount of slip. Alternatively, method 400 may determine slip across the driveline disconnect clutch via measuring a speed of an input side of the driveline disconnect clutch and comparing it to a speed of an output side of the driveline disconnect clutch. If the slip amount across the driveline disconnect clutch is greater than a threshold amount, the answer is yes and method 400 proceeds to 412. If the slip amount across the driveline disconnect clutch is less than a threshold amount, the answer is no and method 400 proceeds to 430. Conditions when slip is low may include but are not limited to when the vehicle is stopped or operating at a creep speed.

At 412, method 400 commands the driveline disconnect clutch to de-stroke (e.g. return the driveline disconnect clutch piston toward a base position). Method 400 may fully open the driveline disconnect clutch by adjusting the driveline disconnect clutch pressure to a liftoff pressure (e.g., a pressure that positions the driveline disconnect clutch at the liftoff position) or to a lower pressure than the liftoff pressure. Thus, method 400 may fully open the driveline disconnect clutch to reduce energy consumption in the driveline when slip across the driveline disconnect clutch is expected to be greater than a threshold amount of slip.

At 430, method 400 commands the driveline disconnect clutch to a stroked position (e.g. a position where the driveline disconnect clutch plates begin to touch so that the torque capacity begins to increase as pressure applied to the driveline disconnect clutch increases). Method 400 returns to 408.

Thus, method 400 may fully close the driveline disconnect clutch, partially close the driveline disconnect clutch, or open the driveline disconnect clutch depending on slip across the driveline disconnect clutch. The amount of slip across the driveline disconnect clutch may be indicative of how much energy may be consumed by the driveline disconnect clutch depending on the driveline disconnect clutch position or pressure within the driveline disconnect clutch.

The method of FIG. 4 provides for a method for operating a vehicle, comprising: via one or more controllers, adjusting a driveline disconnect clutch to a stroked position in response to a vehicle speed being less than a first threshold, a torque converter impeller speed being less than a second threshold, and a derivative of torque converter impeller speed being less than a third threshold. In a first example, the method includes where the stroked position is a position torque capacity begins to increase from substantially zero as a pressure supplied to driveline disconnect clutch increases. In a second example that may include the first example, the method further comprises de-stroking the driveline disconnect clutch from the stroked position in response to the vehicle speed being greater than a first threshold, the torque converter impeller speed being greater than a second threshold, and the derivative of torque converter impeller speed being greater than a third threshold. In a third example that may include one or both of the first and second examples, the method further comprises increasing a closing amount of the driveline disconnect clutch in response to an engine start request. In a fourth example that may include one or more of the first through third examples, the method includes where the engine is started via an electric machine in response to the engine start request. In a fifth example that may include one or more of the first through fourth examples, the method includes where torque generated via the electric machine rotates an engine in response to the engine start request. In a sixth example that may include one or more of the first through fifth examples, the method further comprises propelling the vehicle via the electric machine while starting the engine via the electric machine.

The method of FIG. 4 also provides for a method for operating a vehicle, comprising: via one or more controllers, when a driveline disconnect clutch is at least partially open, adjusting the driveline disconnect clutch to a stroked position in response to a vehicle speed being less than a first threshold, a torque converter impeller speed being less than a second threshold, and a derivative of torque converter impeller speed being less than a third threshold; and increasing a closing amount of the driveline disconnect clutch in response to an engine start request. In a first example, the method includes where increasing the closing amount includes increasing a pressure of fluid supplied to the driveline disconnect clutch. In a second example that may include the first example, the method includes where an engine of the vehicle is stopped when the driveline disconnect clutch is at least partially open. In a third example that may include one or both of the first and second examples, the method further comprises de-stroking the driveline disconnect clutch from the stroked position in response to the vehicle speed being greater than a first threshold, the torque converter impeller speed being greater than a second threshold, and the derivative of torque converter impeller speed being greater than a third threshold. In a fourth example that may include one or more of the first through third examples, the method includes where the driveline disconnect clutch is de-stroked via reducing a pressure of a fluid that is supplied to the driveline disconnect clutch.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This concludes the description. The reading of it by those skilled in the art would bring to mind many alterations and modifications without departing from the spirit and the scope of the description. For example, 13, 14, 15, V6, V8, V10, and V12 engines operating in natural gas, gasoline, diesel, or alternative fuel configurations could use the present description to advantage.

The invention claimed is:

1. A method for operating a vehicle, comprising:
via one or more controllers, adjusting a driveline disconnect clutch to a stroked position in response to a vehicle speed being less than a first threshold, a torque converter impeller speed being less than a second threshold, and a derivative of torque converter impeller speed being less than a third threshold.

2. The method of claim 1, where the stroked position is a position torque capacity begins to increase from substantially zero as a pressure supplied to driveline disconnect clutch increases.

3. The method of claim 1, further comprising de-stroking the driveline disconnect clutch from the stroked position in response to the vehicle speed being greater than the first threshold, the torque converter impeller speed being greater than the second threshold, and the derivative of torque converter impeller speed being greater than the third threshold.

4. The method of claim 1, further comprising increasing a closing amount of the driveline disconnect clutch in response to an engine start request.

5. The method of claim 4, where an engine is started via an electric machine in response to the engine start request.

6. The method of claim 5, where torque generated via the electric machine rotates an engine in response to the engine start request.

7. The method of claim 6, further comprising propelling the vehicle via the electric machine while starting the engine via the electric machine.

8. A method for operating a vehicle, comprising:
via one or more controllers, when a driveline disconnect clutch is at least partially open, adjusting the driveline disconnect clutch to a stroked position in response to a vehicle speed being less than a first threshold, a torque converter impeller speed being less than a second threshold, and a derivative of torque converter impeller speed being less than a third threshold; and
increasing a closing amount of the driveline disconnect clutch in response to an engine start request.

9. The method of claim 8, where increasing the closing amount includes increasing a pressure of fluid supplied to the driveline disconnect clutch.

10. The method of claim 8, where an engine of the vehicle is stopped when the driveline disconnect clutch is at least partially open.

11. The method of claim 8, further comprising de-stroking the driveline disconnect clutch from the stroked position in response to the vehicle speed being greater than the first threshold, the torque converter impeller speed being greater than the second threshold, and the derivative of torque converter impeller speed being greater than the third threshold.

12. The method of claim 8, where the driveline disconnect clutch is de-stroked via reducing a pressure of a fluid that is supplied to the driveline disconnect clutch.

* * * * *